US006793152B1

(12) United States Patent
Drechsel

(10) Patent No.: US 6,793,152 B1
(45) Date of Patent: Sep. 21, 2004

(54) SELF-ADJUSTING ROTATING JOINT, ESPECIALLY FOR LIQUID DISTRIBUTION DEVICES

(76) Inventor: Arno Drechsel, Via Castel Mareccio, 4, 39100 Bolzano (IT)

( * ) Notice: Subject to any disclaimer, the term of this patent is extended or adjusted under 35 U.S.C. 154(b) by 0 days.

(21) Appl. No.: 09/913,587

(22) PCT Filed: Feb. 16, 2000

(86) PCT No.: PCT/IB00/00162

§ 371 (c)(1),
(2), (4) Date: Aug. 15, 2001

(87) PCT Pub. No.: WO00/48741

PCT Pub. Date: Aug. 24, 2000

(30) Foreign Application Priority Data

Feb. 16, 1999 (IT) .......................................... VI99A0030

(51) Int. Cl.[7] .................................................. B05B 3/06
(52) U.S. Cl. ........................ 239/251; 239/252; 239/253; 239/255; 239/256
(58) Field of Search ................................ 239/251, 252, 239/253, 255, 256, 263, 262, 200–206, 237, 240, 225.1, 394

(56) References Cited

U.S. PATENT DOCUMENTS

| 3,744,720 | A |   | 7/1973  | Meyer    |         |
|-----------|---|---|---------|----------|---------|
| 3,921,912 | A | * | 11/1975 | Hayes    | 239/242 |
| 4,231,522 | A |   | 11/1980 | Drechsel |         |
| 5,058,806 | A | * | 10/1991 | Rupar    | 239/205 |
| 5,372,307 | A | * | 12/1994 | Sesser   | 239/210 |
| 5,377,914 | A | * | 1/1995  | Christen | 239/252 |
| 5,671,886 | A | * | 9/1997  | Sesser   | 239/222.21 |

FOREIGN PATENT DOCUMENTS

| CH | 181 969 A   | 4/1936  |
| CH | 323 524 A   | 9/1957  |
| DE | 561 670 C   | 9/1932  |
| DE | 577 183 C   | 5/1933  |
| EP | 0 630 689 A | 12/1994 |

* cited by examiner

Primary Examiner—Davis Hwu
(74) Attorney, Agent, or Firm—R. Neil Sudol; Henry D. Coleman; William J. Sapone

(57) ABSTRACT

A self-adjusting rotating joint (1), especially for liquid distribution devices, including a first substantially tubular element (3), adapted to be connected to a liquid feeding inlet pipe, a second substantially tubular element (2), adapted to be connected to a liquid distribution nozzle, connecting means (6, 25) adapted to connect pivotally first (3) and second element (2), so as to allow their reciprocal rotation around a common axis (V), with limited axial relative displacement, transmitting a reaction force generated by the jet and lying on a plane passing through said common axis (V), braking means (15, 16, 17, 18, 20, 21, 22, 23, 30, 31) to counter the relative rotary motion of the element (2, 3) about the rotation axis (V). The rotating joint is characterised in that the connecting means are made of a substantially cylindrical tubular element (6, 25) with substantially constant outer diameter.

13 Claims, 8 Drawing Sheets

SELF-ADJUSTING ROTATING JOINT, ESPECIALLY FOR LIQUID DISTRIBUTION DEVICES

TECHNICAL FIELD

The present invention relates to a self-adjusting rotating joint, particularly for distribution devices of liquids under pressure, of the pulse sprinkler or similar type, with all the features mentioned in the preamble of the main claim.

The rotating irrigators of the above mentioned type, with continuous or discontinuous operation, can be used in agriculture, for example to irrigate crops or surfaces of various dimensions, or in industry, for dust cloud laying or to humidify, cool down or treat material extracted from mines. Depending on the use, liquids distributed can be of various types, for example pure water, sea water, saline or acid solutions.

Such irrigators may have large dimensions and may be mounted on mobile or fixed irrigation systems. The pressurised liquid is distributed through a nozzle which is connected to the feeding duct of the liquid by means of a rotating joint. Such joint comprises bearings allowing the nozzle to pivot on a full circumference about the axis of the joint, or for a circular sector if the plant or irrigation system so requires, to have the most uniform distribution of the liquid or to avoid spraying of buildings, roads, persons or other kind of obstacles.

On the body of the nozzle, means are provided to crush the jet and to move the nozzle with continuous or stepwise rotation. Because of the strong forces generated by the jet reaction, such joints must be able to transfer high torque. Moreover, to prevent an uncontrolled rotation of the nozzle, the joint is provided with appropriate brake means to resist the moment causing nozzle rotation. Such means exert their braking action at various pressure levels of the liquid flowing in the duct. In this manner the effect of the irrigation is improved, and a more uniform and diffused distribution of the liquid on the surface to be sprinkled or on the cultivation to be irrigated is achieved.

BACKGROUND ART

There are known irrigators of the type described above which can support high pressures and are provided with braking means to ensure a sprinkler rotation as constant and controlled as possible.

U.S. Pat. No. 4,231,522 discloses a stepwise rotating sprinkler provided with a jet deflection system which transmits also the necessary torque to produce jet rotation. In this sprinkler there are also provided braking means ensuring nozzle rotation at substantially constant angular velocity both when the pressure of the irrigation water is rather elevated, that is at full capacity operation, and when the pressure is comparatively low, for example during the system starting phase, when the liquid feeding pump has not reached the steady state or operates at a reduced pressure for other reasons.

In such sprinkler it is necessary to provide for a structural element which has the function of transferring the high forces produced by the jet. This element joins the two parts of the rotating joint moving with relative motion and has both the function of transmitting the torque generated by jet reaction and that of being an interaction surface for the braking elements.

A first disadvantage of this known sprinkler is that the structural element connecting the two parts of the rotating joint is rather difficult to make because it must be submitted to a rather high number of machining operations starting from a single piece, which is a rather difficult and costly operation.

Moreover the complex shape of this piece is such as to cause an excessive scrap of material during the manufacture. In addition, since such element must be water tight in the contact zone with the packing and the bearing placed around it, it must have an accurate surface finish. Generally such pieces require very fine and accurate working of the surface with a machine tool and subsequently their surface must be hardened or chrome-plated to guarantee maximum resistance against oxidation and abrasive action of the liquid.

In the sealing zone between bearing and tubular element, it is necessary to provide for as small as possible a clearance between the moving parts to guarantee a perfect water tightness of the lip seal, as liquid leakage can produce in the long run oxidation, or even corrosion in other elements of the joint hampering correct operation thereof. The liquid to be sprayed generally contains many impurities that can sometimes seep in the contact zones between the two elements which rotate relatively to each other and can damage the surface of the bearing and that of the chrome-plated metal element.

It has also been proposed to use sprinklers with rotating joints characterised by high mechanical resistance to counter the torque acting on the joint itself when the sprinkler is in operation. A solution of this kind is described in EP-B-630689 disclosing a rotating joint for sprinkler, provided with braking means and with high flexural resistance to bending caused by jet reaction. However such joint presents a remarkable complexity, as the various parts from which it is formed have complex shapes and are thus expensive to manufacture.

SUMMARY OF THE INVENTION

It is an object of the present invention to overcome the above mentioned drawbacks by providing a self-adjusting rotating joint for liquid distribution, in particular for irrigation, which has a simplified structure, is easy to produce, has high effectiveness and low cost.

Another object of the invention is to provide a self adjusting rotating joint with a high flexural stiffness against the jet reaction force.

It is a further object of the invention to provide a lighter joint compared to known sprinkler joints.

Another object of the invention is to provide a rotating joint with no need for maintenance during long periods.

Another object of the present invention is to provide a rotating joint having a simplified structure such as to allow easy assembling and disassembling for spare part substitution and providing high reliability.

These objects and other that will become apparent hereinafter are achieved by a rotating joint as defined in the attached claim 1.

BRIEF DESCRIPTION OF THE DRAWINGS

Further characteristics and advantages of the invention will become apparent from the detailed description of some preferred, but non exclusive, embodiments of the rotating joint according to the invention, illustrated by way of a non limitative example by means of the enclosed drawings where.

DETAILED DESCRIPTION OF SOME PREFERRED EMBODIMENTS

Figure 1:
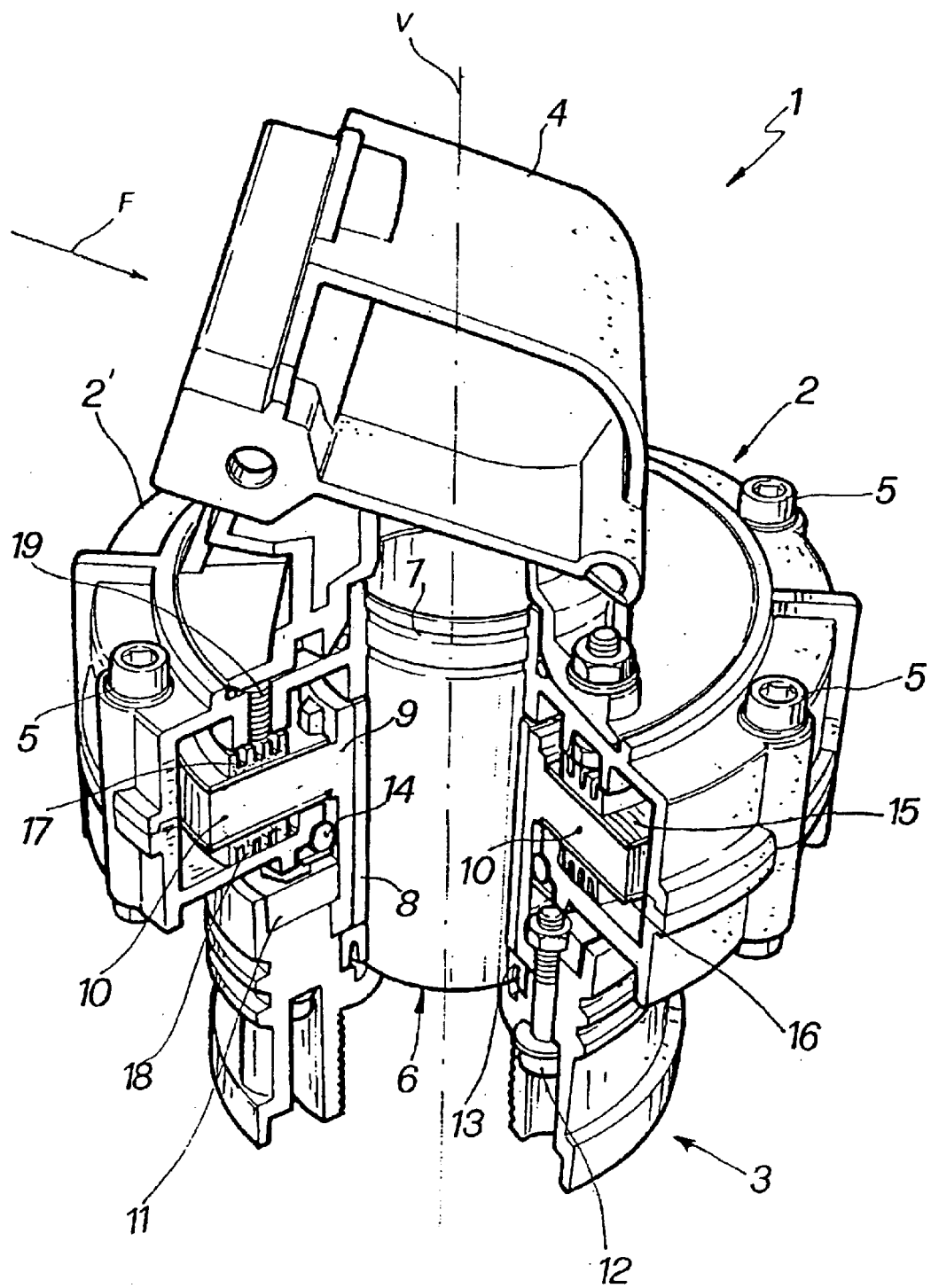
FIG. 1 shows a partially sectioned perspective view of the rotating joint according to the invention.
Figure 2:
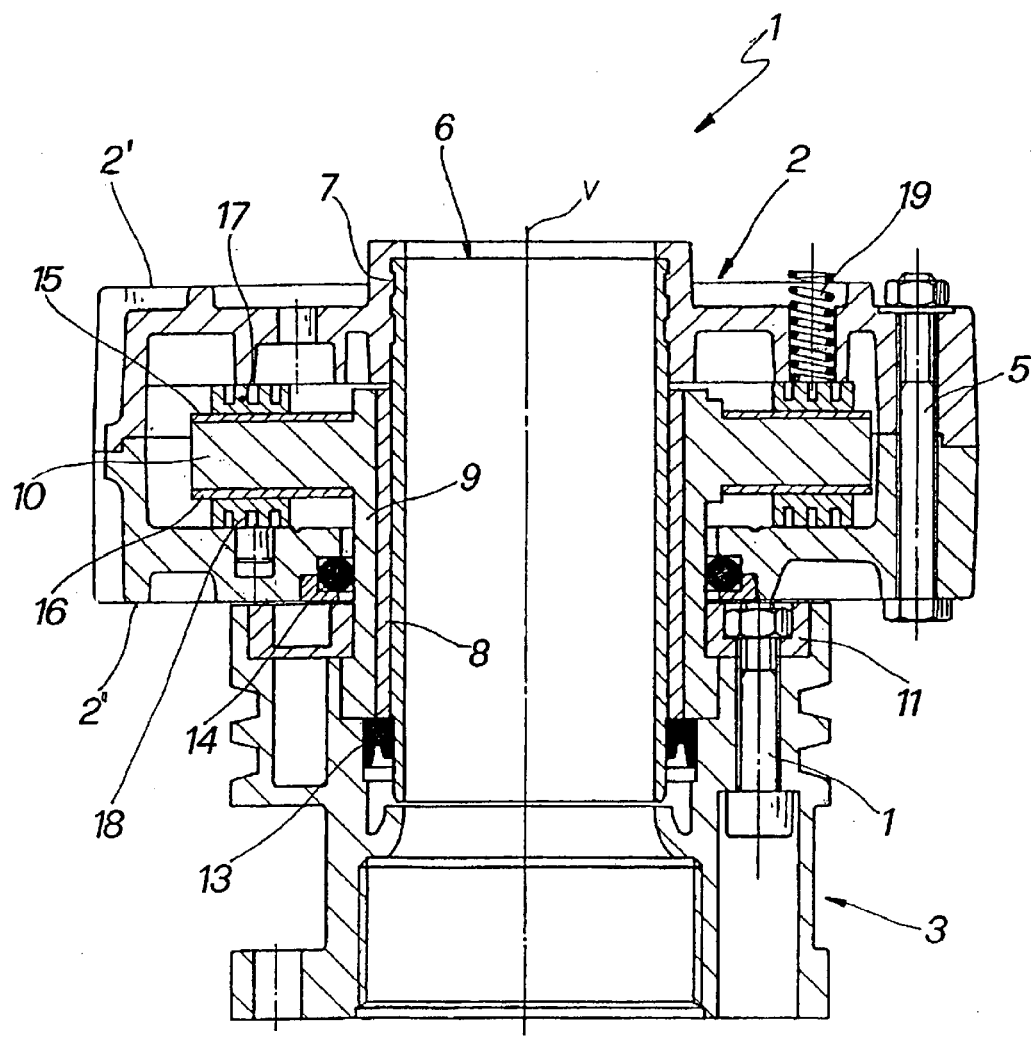
FIG. 2 shows a longitudinal sectional view taken along an axial plane of the joint of FIG. 1.

With reference to the cited FIGS. 1 and 2, the rotating joint, generally indicated with reference numeral 1, is essentially made of two main elements referenced respectively 2 and 3. A lower element 3 has a substantially tubular shape and is connected to an irrigation liquid feeding duct, not shown in the drawings, by means of a threaded fastener, a flange or other equivalent connecting means. A lower element 5 can be fixed to the ground, to a rigid column or to a self-moving structure.

The upper portion of the lower element 3 is connected to the upper element 2, which is likewise of substantially tubular shape. These elements are mutually joined with suitable connection means, so as to allow relative rotation of the upper element 2 with respect to the lower fixed element 3 around a substantially vertical axis V, common to both elements.

The upper element 2 is connected to an elbow joint 4, to which a nozzle producing the jet, not shown in the drawings, is generally connected. In turn, suitable means for drawing kinetic energy, of known type, may be provided to impart to the nozzle, and consequently to its upper element 2, a cyclic rotation, about the axis V, over a complete turn or only by a circular sector.

The two elements 2 and 3 forming the body of the joint are advantageously made of particularly light material, suitably selected to reduce the weight of the assembly and to produce the necessary resistance to forces generated during use by the pressurised liquid.

The upper element 2, which functions also as joint cover, is so shaped to reduce to a minimum infiltration from the outside of water splitting during irrigation or which is splashed backward by the nozzle propulsion system.

The upper element 2 is advantageously made of two portions 2' and 2" reciprocally coupled by means of screws 5 so as to facilitate access to the joint 1 and to allow an easy maintenance, repair or substitution of the various components subject to wear.

According to the invention, the pivot connection means between the upper element 2 and the lower one 3 is constituted by a substantially cylindrical tubular element 6, having a substantially constant outer diameter and a longitudinal axis V.

Thus, the connecting tubular element 6 will allow rotation of the movable element 2 with respect to fixed element 3 about the common axis V, while allowing limited axial relative movement of these elements 2, 3, so as to allow the transmission of reaction forces generated by the jet and acting in a substantially vertical plane passing through the rotation axis V.

Advantageously, the connecting tubular element 6 may be obtained by cutting a piece of appropriate length from an indefinite pipe. Still more advantageously, such indefinite pipe can be chosen between those normally available on the market, with diameter of appropriate dimensions and with appropriate surface finishing adapted to ensure low coupling tolerance. Thus, it will be possible to reduce the production costs of this important component.

Preferably, the connecting element 6 can be made of metal, for example stainless steel, or other materials having the same mechanical strength, resistance to oxidation and corrosion, such as composite or ceramic materials.

In a first embodiment, the element 6 is rigidly attached to the upper element 2 of the joint 1. The attachment can be made by gluing, pressing, welding, immersion, threading or any other similar means, depending on the materials of which are made the pieces to be reciprocally coupled. To improve anchoring and ensure a stable coupling with element 2, the outer surface of the connection element 6 can be provided with surface discontinuities, such as e.g. grooves, annular and/or radial notches 7, or other similar shapes.

A bushing or bearing 8 in antifriction material, for example plastic material with low friction coefficient and high resistance to compression, is located between the body of the fixed element 3 and the connecting tubular element 6. The bushing or bearing 8 has narrow tolerances with respect to element 6 to allow free rotation thereof, though ensuring sufficient tightness between the two elements 2, 3.

In turn, the bearing 8 is fixedly secured to a sleeve 9 having a radially outwardly extending flange 10. The sleeve 9 is in turn anchored to the lower element 3 of the joint by means of a ring 11 fixed by screws or bolts 12.

A first lip gasket 13 is interposed between elements 2, 3 to avoid leakage between the two elements, which would produce pressure losses with reduction of liquid distribution efficiency. Moreover, as the irrigation liquid is generally mixed with dirt, the infiltration of such dirt between the bearing 8 and the connecting element 6 in the long run causes scratches or notches both on the internal surface of the bearing 8 and on the outer surface of the element 6. This would involve a quicker consumption of the components, with an increase of costs and high seizure risk between the parts in relative movement, with consequent blocking of the rotating part.

In addition to the first gasket 13, a second gasket 14 may be provided to avoid infiltration of liquid, dust cloud, sand or other impurity in the interstices between bearing 8 and pipe 6, neither from the outside nor from the inside of the joint.

Two flat rings 15 and 16 made of material of greater hardness than that of the material of the sleeve 8, preferably stainless steel, are fixed on flange 10. One of the rings, in particular the ring 15 is fixed to the upper surface of the flange 10, the other ring 16 is fixed to the lower surface of the flange 10.

Rings 15 and 16 define contact surfaces for corresponding pads 17 and 18 and constitute with the latter braking means for adjusting the rotation speed of the irrigation nozzle. Pads 17 and 18 operate like normal disk brakes both when the liquid pressure is high and when the pressure is low.

As mentioned above, the upper element 2 can axially shift by a limited distance with respect to the lower element 3, so as to force upward the pad 18 when the water is pressurised, and to act by gravity on the pad 17 when the liquid pressure in the irrigation duct drops to a minimal level.

Pads 17 and 18 are suitably made of high resistance plastic material and can extend along a whole circumference to form a unitary ring.

As an alternative, they can be shaped as separate annular segments. Pads 17 and 18 are constantly kept in contact with rings 15 and 16 by suitable elastic means, such as e.g. compression springs 19 or equivalent means.

Figure 3:
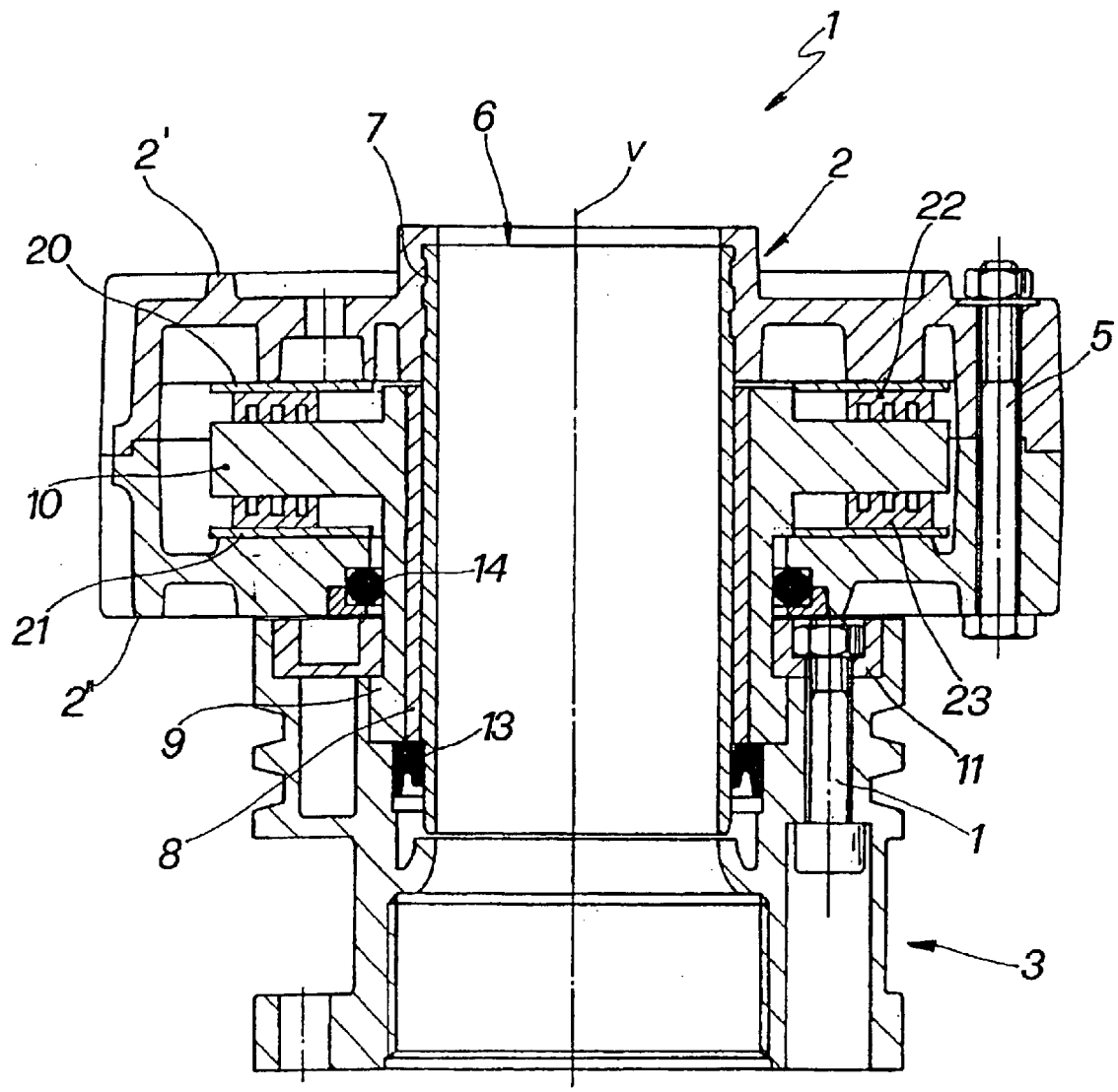
FIG. 3 shows a longitudinal sectional view taken along an axla plane of a modified embodiment of the joint of the FIGS. 1 and 2.

In the alternative embodiment of the joint shown in the FIG. 3, the elements equivalent to those of FIGS. 1 to 3 have been identified with the same reference numerals. In such alternative embodiment, the position of the contact rings 20 and 21 and pads 22 and 23 is inverted. In other words, the pads 22, 23 act against the opposite surfaces of the flange 10 and are urged against the same by springs placed in corresponding seats made in the flange, not shown in the figure.

Figure 4:
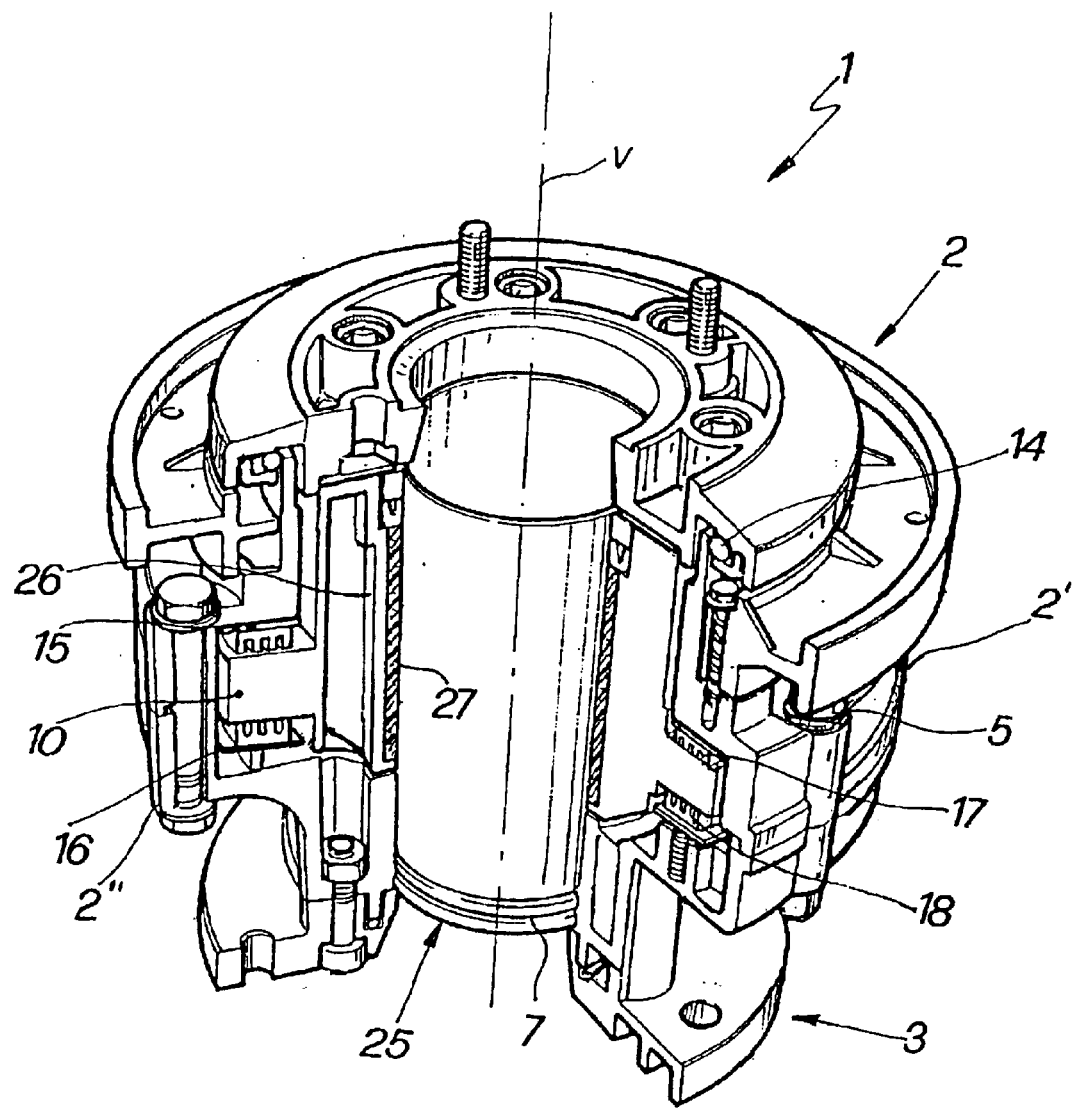
FIG. 4 shows an overall perspective and partially sectioned view of a second embodiment of the rotating joint according to the invention.

The FIG. 4 shows another embodiment of the joint according to the invention, in which the connecting tubular element 25 is fixedly secured to the lower element 3 and remains stationary during rotation of the irrigation nozzle, while the upper element 2 rotates with respect to the elements 3 and 25 fixed to each other.

On the contrary, the sleeve 26 and the bearing or bushing 27 are jointly anchored to the upper element 2 and turn also with respect to the lower element 3.

Figure 5:
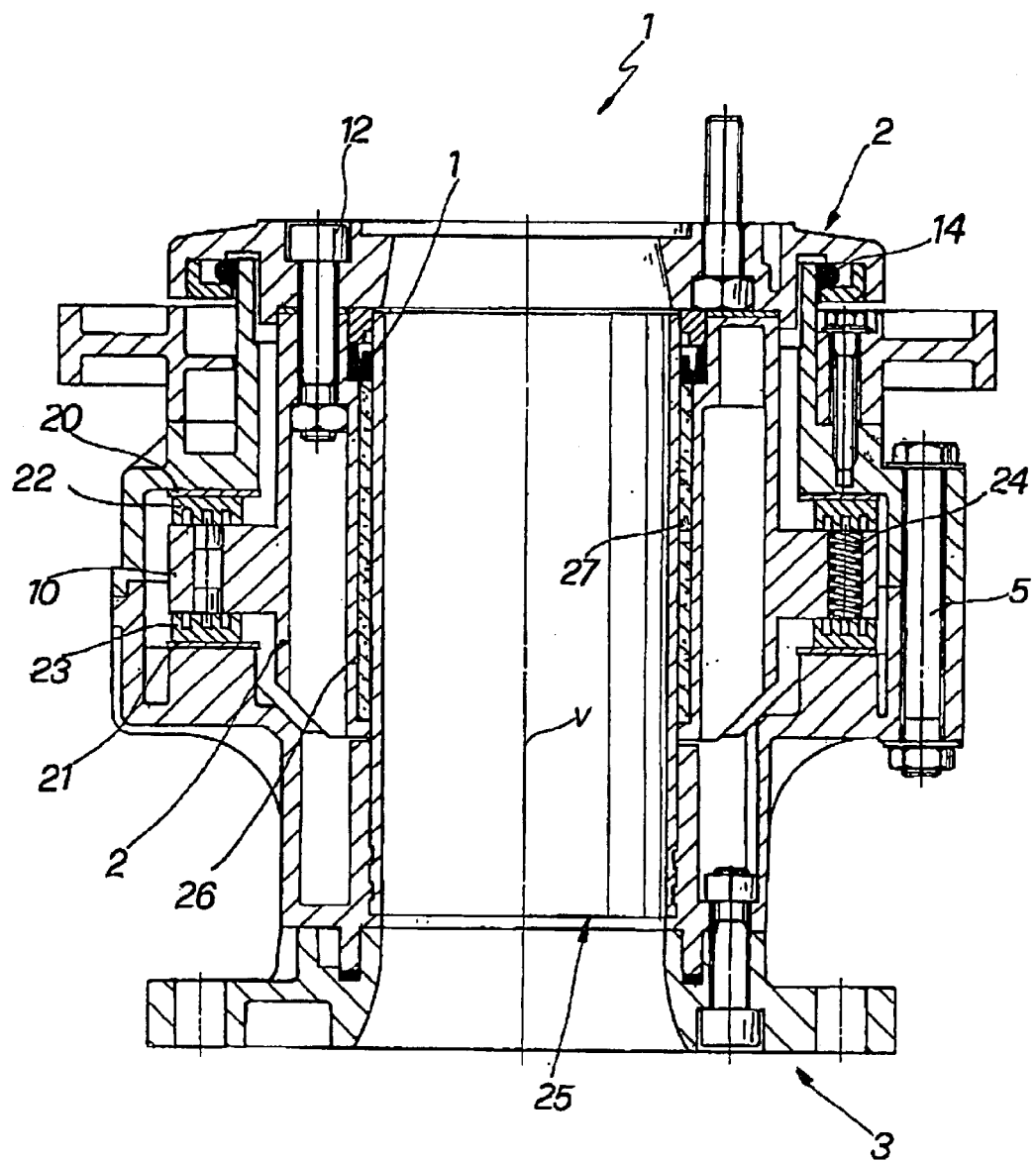
FIG. 5 shows a longitudinal sectional view taken along an axial plane of the joint of FIG. 4.

Also in this second embodiment it is possible to provide two alternate arrangements of the braking means. In the first arrangement, illustrated in FIG. 5, the pads 22 and 23 are driven into rotation by the flange 10, while the respective metal contact discs 20 and 21 are joined to corresponding surfaces of the upper element 2. Such arrangement corresponds to that with the braking means already shown and disclosed in FIG. 3.

Figure 6:
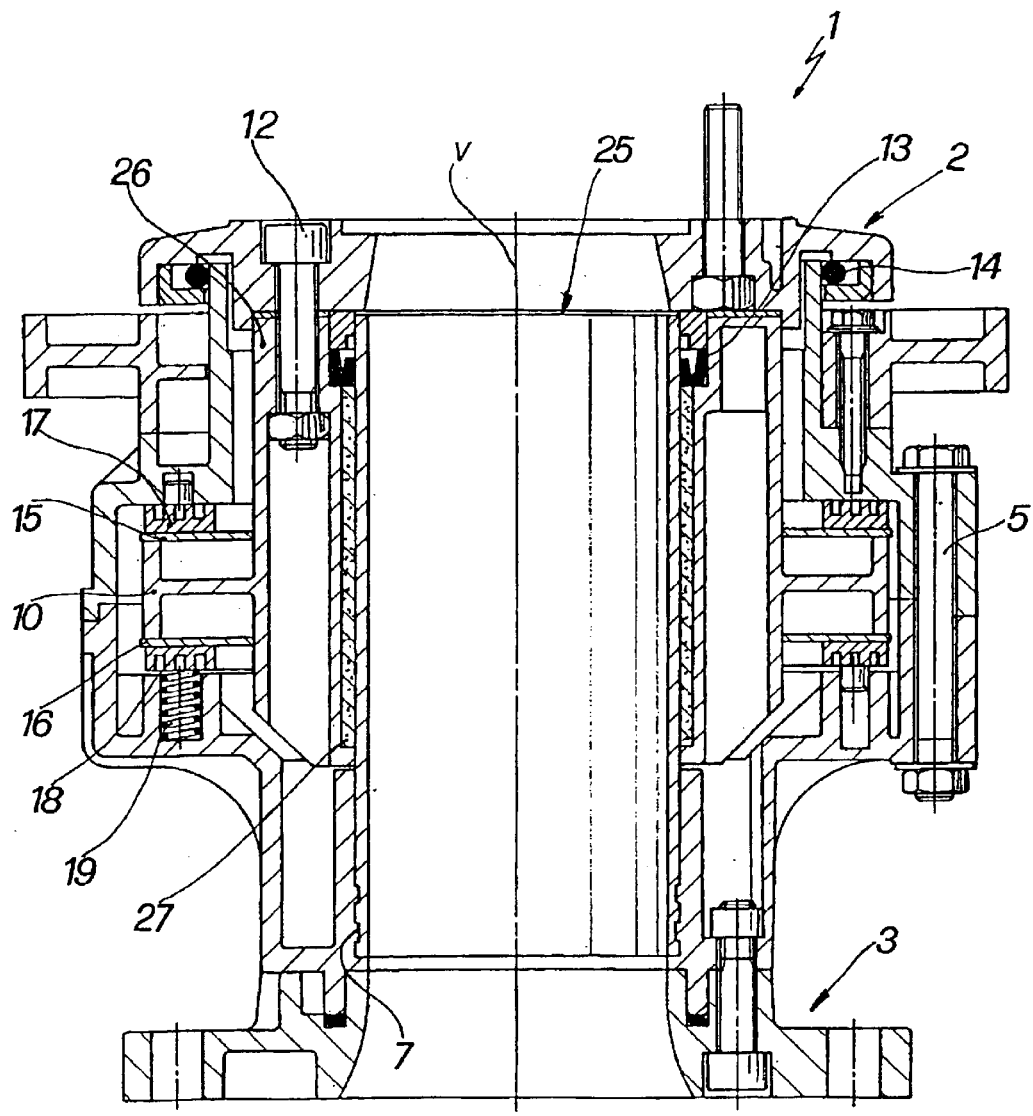
FIG. 6 shows a longitudinal sectional view taken along an axial plane f an embodiment of the joint of FIG. 4.

The second arrangement of the braking means, schematically depicted in FIG. 6, corresponds to the arrangement with the braking pads equivalent to that already visible in FIGS. 1 and 2, in which the pads 17, 18 are driven in rotation by the upper element 2 of the joint and act against the rings 15, 16 fixedly joined to the upper and lower surfaces of the flange 10.

Figure 7:
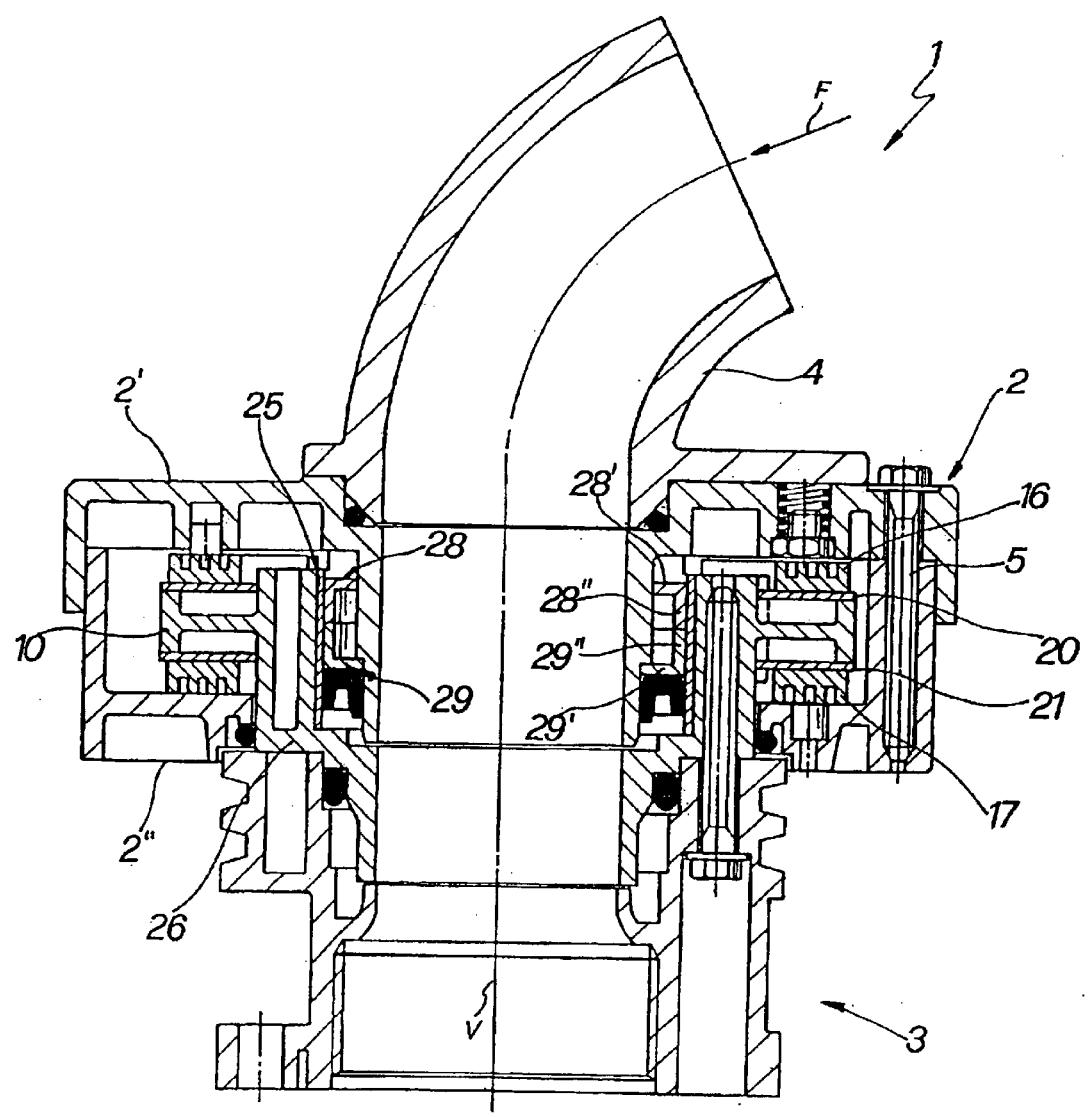
FIG. 7 shows a longitudinal sectional view taken along an axial plane of a further embodiment of the rotating joint according to the invention.

In the embodiment of the joint according to the invention shown in FIG. 7, elements similar to those of the embodiments already described in the previous figures have been identified with the same reference numerals. In this embodiment, which has a structure similar to that of FIG. 1 and 2, the connecting tubular element 25 is jointly secured to the fixed lower element 3 by suitable securing means.

Two rings 28 and 29 having supporting function for the element 2 are placed around the upper rotating element 2. These rings act as friction bearings and for this reason are made of low friction material, for example plastic, with high structural resistance and low friction factor. Such bearings maintain the rotating element 2 in the right position with respect to the fixed element 3 and allow its rotation under the action of the torque produced by the jet of liquid flowing out from the nozzle.

Rings 28, 29 have a substantially L-shaped cross section, with shorter sides 28', 29' and longer sides 28", 29". The shorter sides 28', 29' are substantially planar and perpendicular to the rotation axis V and they act as guides for element 2. The longer sides 28" and 29" define cylindrical friction surfaces acting against the internal surface of the connecting tubular element 25. Also in this embodiment the gasket 13, for example of the lip type, ensures perfect water tightness of the joint.

It is observed that in all the embodiments described heretofore the flange 10 can be provided with lightening grooves of various shapes, and made of a lighter material than that of elements 6, 25. In fact in the embodiments of joint according to the invention, the forces acting on the sleeve are smaller than those acting on the connection element 6, 25, which must instead support strong bending moments.

Figure 8:
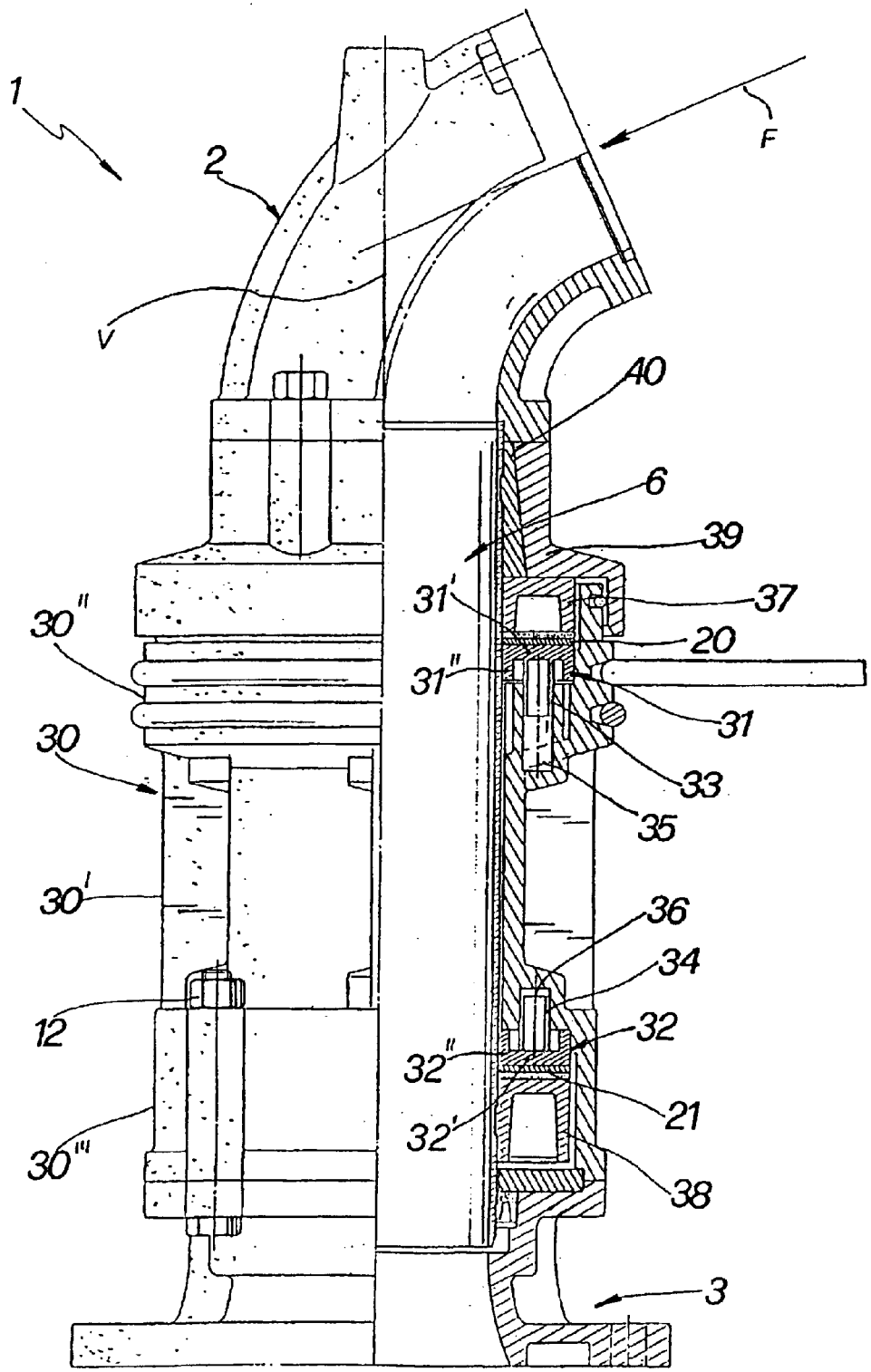
FIG. 8 shows a longitudinal section along an axial plane of a further modified embodiment of the joint according to the invention.

FIG. 8 shows a further alternative embodiment of the joint according to the invention, in which the tubular connecting element 6 is unitarily secured to the upper element 2 of the joint and rotates together with the latter with respect to the fixed lower element 3.

A peculiarity of this latter embodiment is that the tubular connecting element 6 has a rather big length and low thickness as compared with the former embodiments.

An outer sleeve 30 is fixedly secured to the lower element 3 by means of screws 12. In the sleeve there can be recognised an essentially cylindrical central portion 30' connected to axial end portions 30", 30''' with outer diameters larger than those of the central portion 30'.

Inside the end portions 30", 30''', there are placed respective pads 31, 32, made of plastic material or similar, having axial protrusions 33, 34 engaging with corresponding seats 35, 36 made in the portions 30", 30'''.

Pads 31 and 32 have substantially planar annular portions 31', 32' acting against the facing surfaces of rings 20 and 21 fixedly attached to the tubular element 6, so as to exert a braking action on rings 20, 21. Pads 31, 32 are axially forced against the rings 20, 21 by compression springs or equivalent elastic means, not shown in the figure and placed in the seats 35, 36.

Pads 31, 32 more over have internal cylindrical surfaces 31", 32" acting on th external surface of the tubular element 6 to exert on it a reaction to the radial force F produced by the jet of liquid flowing from the nozzle of the irrigator. The distance between the two portions 30" and 30''' is suitably selected in such a manner that the abovementioned reaction force F produces strong radial stresses that can be borne by a part of the rings 31 and 32. In this embodiment, the tubular connecting element 6 is provided with two connecting rings respectively referenced 37, 38 and axially mutually spaced. The connection rings 37, 38 are secured with any known means, respectively to the upper and lower end portions of the connecting element 6.

Particularly, the upper ring 37 is rigidly secured to the tubular element 6 in correspondence of the upper end portion by means of a metal ring 39 with conical cross section that is adapted to tighten a split ring 40, having a similar conical cross section but with inverted taper. Rings 37 and 38 define respective axial abutments for rings 20 and 21 which provide the braking surfaces.

Although the self-adjusting rotating joint according to the invention has been described with specific reference to the reference numerals indicated in the description and in the figures, it is obvious that such numerals are purely indicative and in no way limit the scope of invention as defined in the appended claims.

What is claimed is:

1. A self-adjusting rotating joint, particularly for liquid distribution devices, comprising:

a substantially tubular stationary lower element adapted to be connected to a liquid feeding inlet pipe;

a substantially tubular rotatable upper element adapted to be connected to a liquid distribution nozzle;

connecting means adapted to pivotally connect said upper rotatable element and said lower stationary element so as to allow their relative rotation about a common axis with limited axial relative displacement, thereby transferring a reaction force produced by the jet in a plane passing through said common axis;

braking means to counter the relative rotation of said upper and said lower elements about said rotation axis;

said connecting means comprising a substantially cylindrical tubular connecting element with substantially constant outer diameter;

said tubular connecting element being a section of predetermined length cut from an indefinite pipe having a substantially cylindrical outer surface with no annular flange, said section of pipe being rigidly secured to one of said upper and lower element with at least part of said substantially cylindrical outer surface, said braking means being separate from said tubular connecting element, a sleeve of substantially cylindrical shape being rigidly attached to one of said upper and lower elements for interacting with said braking means to controllably counter the rotation of said upper rotatable element.

2. The self-adjusting rotating joint according to claim 1 wherein said tubular connecting element is rotatably coupled to the other of said upper and lower elements with the interposition of at least one antifriction annular member.

3. The self-adjusting rotating joint according to claim 1 wherein said tubular connecting element is fixedly attached to said upper rotatable element.

4. The self-adjusting rotating joint according to claim 3 wherein said sleeve has a flange interacting with said braking means to controllably counter the rotation of said upper rotatable element.

5. The self-adjusting rotating joint according to claim 4 wherein said braking means comprise pads of material with high wear resistance, adapted to interact with substantially annular braking surfaces unitarily joined to said flange.

6. The self-adjusting rotating joint according to claim 3 wherein said sleeve is rigidly secured to an end portion of said lower stationary element and is placed peripherally of said tubular connecting element.

7. The self-adjusting rotating joint according to claim 6 wherein said sleeve has a substantial cylindrical central portion connected to axial end portions adapted to house substantially annular braking pads.

8. The self-adjusting rotating joint according to claim 7 wherein said annular braking pads have internal cylindrical surfaces in friction contact with said tubular connecting element to transfer the reaction to the force exerted by the jet in an axial plane passing through said common axis, and planar annular surfaces acting on braking surfaces connected to said upper rotatable element to controllably counter its rotation with respect to said lower stationary element.

9. The self-adjusting rotating joint according to claim 1 wherein said tubular connecting element is unitarily fixed to said lower stationary element.

10. The self-adjusting rotating joint according to claim 9 wherein annular members are rigidly fixed to said upper rotatable element, said annular members being axially spaced and being interposed between said tubular connection element and said upper rotatable element to define a friction pad and to transmit to said lower stationary element forces acting on said upper rotatable element 24.

11. The self-adjusting rotating joint according to claim 9 wherein said sleeve is rigidly coupled to said upper rotatable element and is provided with a flange interacting with said braking means.

12. The self-adjusting rotating joint according to claim 11 wherein said braking means consist of pads unitarily secured to said flange on opposite sides thereof and adapted to interact with braking surfaces defined by substantially annular elements of high wear resistance material.

13. The self-adjusting rotating joint according to claim 5 wherein said pads are shaped as continuous rings or circular sectors circumferentially spaced and placed peripherally of said sleeve, elastic means being provided to force said pads against said braking surfaces.

* * * * *